United States Patent
Oishi et al.

[11] Patent Number: 6,002,189
[45] Date of Patent: Dec. 14, 1999

[54] STATOR CORE AND WIRE WINDING METHOD FOR THE SAME

[75] Inventors: Yasuo Oishi, Fujieda, Japan; Seiichiro Kobayashi, Nakorn Ratchasima, Thailand; Hiroshi Muramatsu; Hidetoshi Kajiwara, both of Fujieda, Japan

[73] Assignee: Victor Company of Japan, Ltd., Yokohama, Japan

[21] Appl. No.: 09/103,302

[22] Filed: Jun. 23, 1998

[30] Foreign Application Priority Data

Jun. 24, 1997 [JP] Japan ................................ 9-183155

[51] Int. Cl.$^6$ ........................................ H02K 3/00
[52] U.S. Cl. .................. 310/179; 310/178; 310/198; 310/194; 310/164; 310/203; 310/260
[58] Field of Search .................... 310/179, 178, 310/198, 194, 164, 203, 260

[56] References Cited

U.S. PATENT DOCUMENTS

| | | | |
|---|---|---|---|
| 4,329,610 | 5/1982 | Klein | 310/220 |
| 4,859,890 | 8/1989 | Sedgewick | 310/208 |
| 5,336,956 | 8/1994 | Haner | 310/179 |
| 5,525,850 | 6/1996 | Stinson | 310/194 |

FOREIGN PATENT DOCUMENTS

| | | |
|---|---|---|
| 4-275042 | 9/1992 | Japan . |
| 4-331436 | 11/1992 | Japan . |
| 6-054475 | 2/1994 | Japan . |
| 6-225458 | 8/1994 | Japan . |
| 8-126281 | 5/1996 | Japan . |

*Primary Examiner*—Nestor Ramirez
*Assistant Examiner*—Thanh Lam
*Attorney, Agent, or Firm*—Michael N. Meller; Eugene Lieberstein

[57] ABSTRACT

A stator core has 3N salient poles arranged circularly where N is a natural number of four or more but except a multiple of three. Coils are formed around the salient poles where winding directions of the coils is the same for the salient poles. A first, a second and a third crossover are formed between a first and an (N+1)-th salient pole, between the (N+1)-th and a (2N+1)-th salient pole and between the (2N+1)-th and the first salient pole, respectively, to forming a triangle before cutting within the salient poles arranged circularly. An end portion of each crossover is connected to a substrate.

6 Claims, 4 Drawing Sheets

STATOR CORE AND WIRE WINDING METHOD FOR THE SAME

BACKGROUND OF THE INVENTION

The present invention relates to a stator core. Particularly, this invention relates a stator core of a motor which is smaller in size and thinner used for storage devices of apparatuses for office automation, video tape recorders, and so on, and a wire winding method for the stator core.

Motors used for hard disc drives, floppy disc drives as memory devices of apparatuses for office automation, and for video tape recorders, etc., have recently an accelerative trend for smaller and thinner with smaller apparatus. Further, higher performance, lower cost, and higher productivity have been demanded for such motors. Among them, particularly, connection of coil terminals requires increased number of processes, leading to higher cost.

FIG. 1 shows a stator core applied with a conventional wire winding method as related art; and FIG. 2 shows the state where a stator core is mounted on a printed substrate.

A lead wire 20 for a core coil is tied up and soldered to a metal pin 22 provided on a holder 21 formed of resin, and wound around each stator core to form a coil 15. A protrusion 25 provided on the lower part of the holder 21 is inserted into a hole 26 provided in a corresponding printed substrate 12 and caulked. Further, the metal pin 22 is soldered at its printed substrate side, and a crossover 20 of the coil 15 is connected to the printed substrate 12.

However, the conventional configuration has a problem in that since the number of processes of tying up the lead wire to the metal pin is increased, the assembly time is required, and a resin holder, a metal pin and equipment or fitting for assembling them are necessary, thus increasing the cost.

Japanese Patent Laid-Open No. 1994(6)-225488 discloses a wire winding method in which a coil is formed continuously without disconnection halfway. A crossover between coils passing through upper or lower portion of an opening provided in a stator core is cut, whose cut portion is soldered to a printed substrate.

However, a winding direction to a salient pole is not constant, and hence extra time for winding is required; and since crossovers run vertically and horizontally, places where crossovers are cut are difficult to be specified, and hence a long assembling time is required.

SUMMARY OF THE INVENTION

A purpose of the present invention provides a stator core with salient poles arranged circularly and a method of winding a wire as a coil at the stator core with less assembly time.

The present invention provides a stator core with 3N salient poles arranged circularly, N being a natural number of four or more but except a multiple of three, coils being formed around the salient poles, winding directions of the coils being the same for the salient poles, a first, a second and a third crossover being formed between a first and an (N+1)-th salient pole, between the (N+1)-th and a (2N+1)-th salient pole and between the (2N+1)-th and the first salient pole, respectively, the crossovers forming a triangle before cutting within the salient poles arranged circularly, an end portion of each crossover being connected to a substrate.

Further, the present invention provides a method of winding a wire as a coil at a stator core with 3N salient poles arranged circularly, N being a natural number of four or more but except a multiple of three, the method comprising the steps of: forming coils around the salient poles, winding directions of the coils being the same for the salient poles; forming at least a first, a second and a third crossover between a first and an (N+1)-th salient pole, between the (N+1)-th and a (2N+1)-th salient pole and between the (2N+1)-th and the first salient pole, respectively, so that the crossovers form a triangle within the salient poles arranged circularly; cutting an intermediate portion of each crossover; and connecting an end portion of each crossover formed by the cutting to a substrate.

Further, the present invention provides a method of winding a wire as a coil at a stator core with 3N salient poles arranged circularly, N being a natural number of four or more but except a multiple of three, comprising the steps of: winding a first wire around a first salient pole that is N poles before an (N+1)-th salient pole; forming a first crossover using the first wire between the first and (N+1)-th salient poles; winding the first wire around the (N+1)-th salient pole; winding the first wire around every third salient pole from the (N+1)-th salient pole to a salient pole that is three poles before the (N+1)-th salient pole; winding a second wire around the (N+1)-th salient pole; forming a second crossover using the second wire between the (N+1)-th salient pole and a (2N+1)-th salient pole; winding the second wire around every third salient pole from the (2N+1)-th salient pole to a salient pole that is three poles before the (2N+1)-th salient pole; winding a third wire around the (2N+1)-th salient pole; forming a third crossover using the third wire between the (2N+1)-th and first salient poles; winding the third wire around every third salient pole from the first salient pole to a salient pole that is three poles before the first salient pole; forming a fourth crossover using the third wire between the first and (N+1)-th salient poles; and winding the third wire around the (N+1)-th salient pole.

DETAILED DESCRIPTION OF THE PREFERRED EMBODIMENT

A preferred embodiment according to the present invention will be explained hereinafter with reference to FIGS. 3 to 6.

Figure 1:
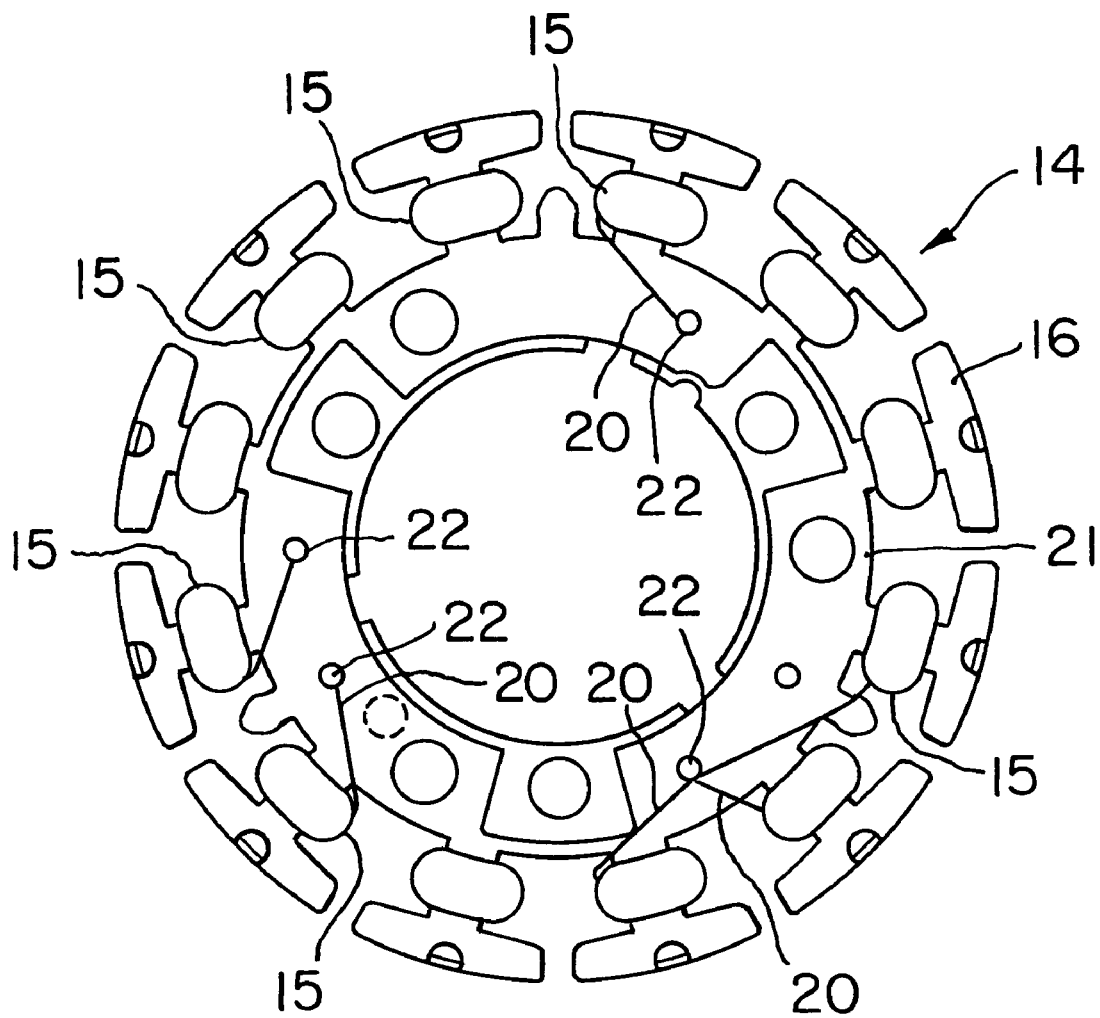
FIG. 1 shows one example of a conventional stator core.
Figure 2:
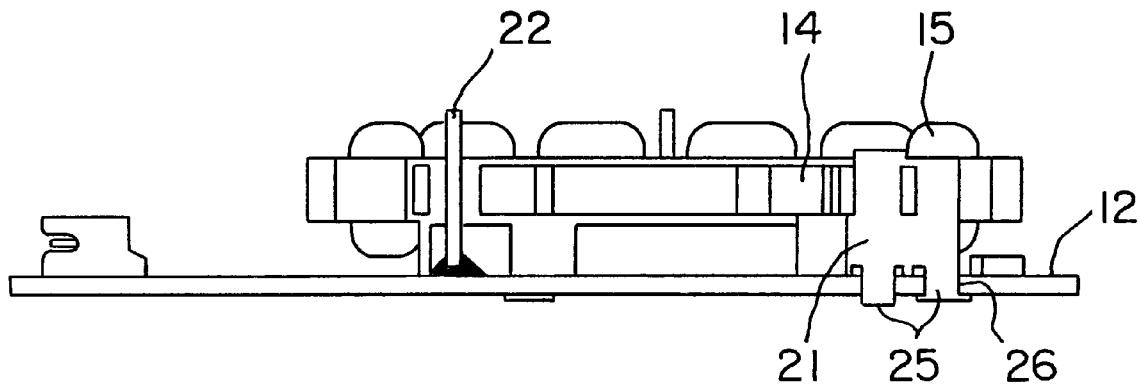
FIG. 2 shows a state where the conventional stator core is mounted on a printed substrate.
Figure 3:
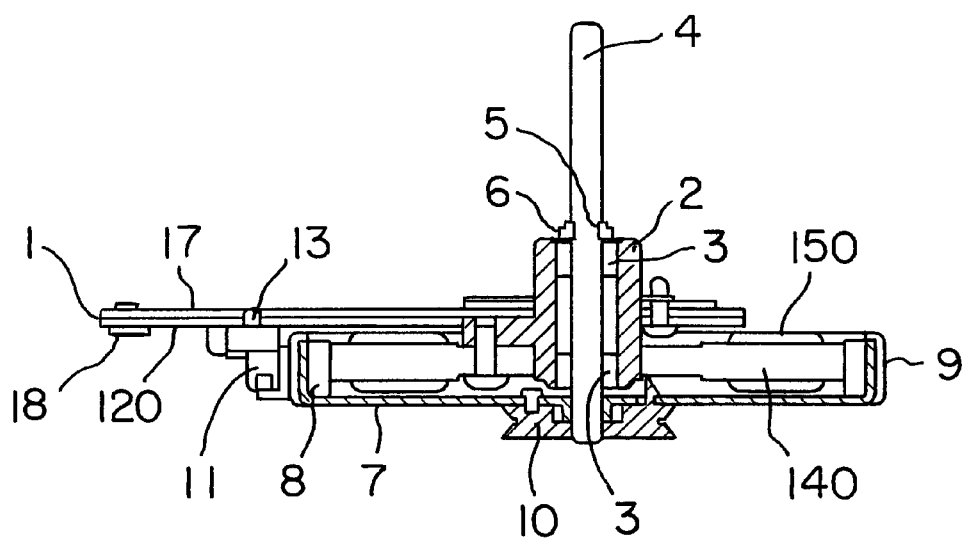
FIG. 3 is a side sectional view showing an embodiment of a capstan motor using a stator core according to the present invention.
Figure 4:
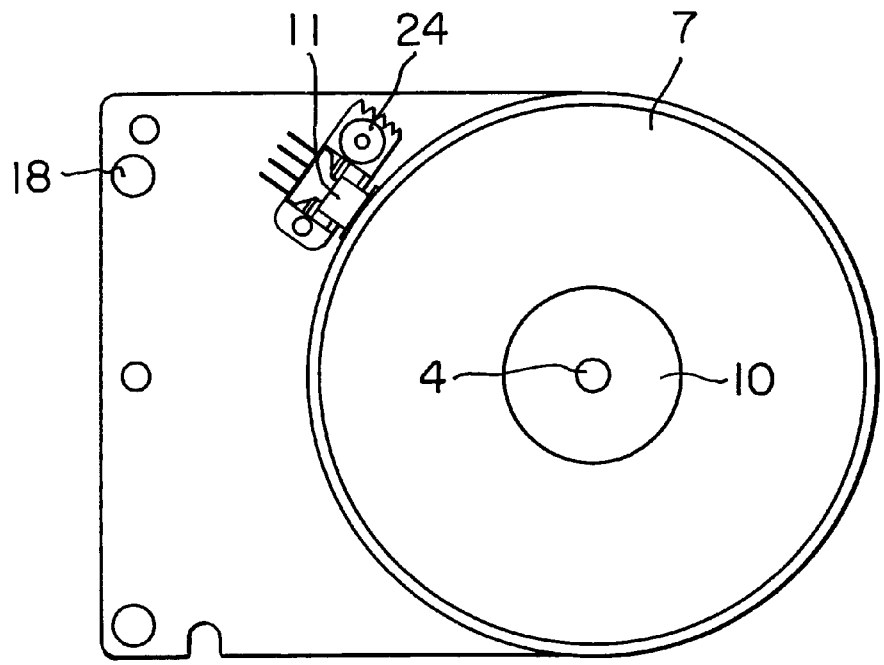
FIG. 4 is a bottom view showing the capstan motor using the stator core of FIG. 3 according to the present invention.
Figure 5:
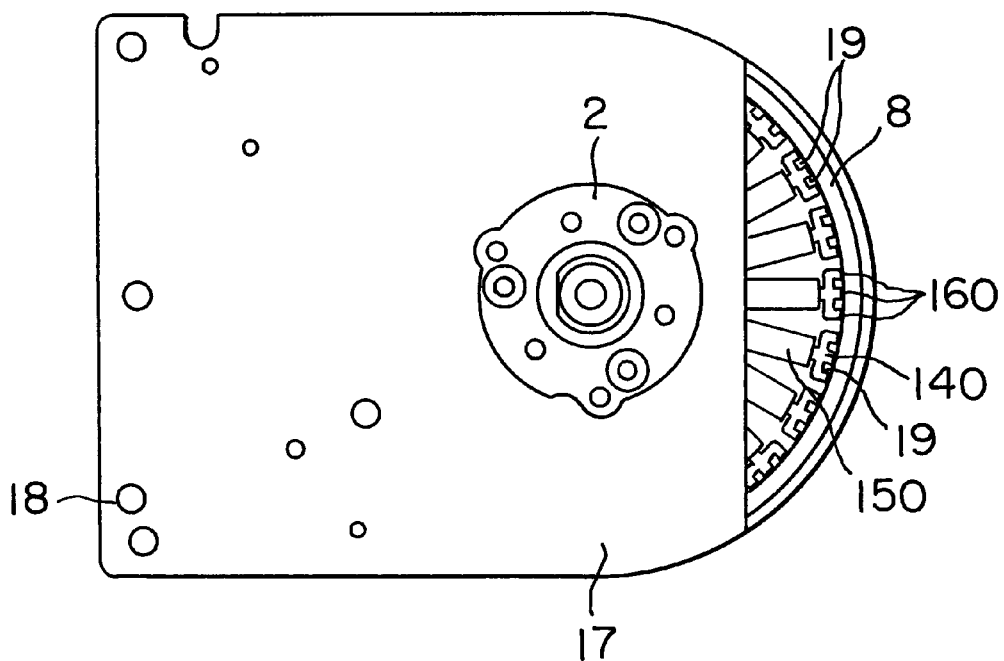
FIG. 5 is a plan view showing the capstan motor using the stator core of FIG. 3 according to the present invention.

As shown in FIG. 3, a bearing holder 2 formed of resin is mounted on a stator 1, and a pair of sintered alloy bearings 3 are secured to an internal circumference thereof. A capstan and shaft 4 is rotatably supported by the sintered alloy bearings 3, and in a central portion of the shaft 4 is provided a groove 5 for preventing a shaft from being slipped out, and is mounted a ring 6 made of resin.

On the shaft 4 is mounted an integrally rotating rotor 7, and a drive magnet 8 is magnetized in 16 poles and mounted on the internal circumference of the rotor 7. A ring-like magnet 9 for frequency generator (FG magnet) is magnetized in multi-pole, i.e. 360 poles and mounted on the external circumference of the rotor 7. A rotation transmitting pulley 10 formed of resin is fixedly mounted about the shaft 4 on the bottom surface about which the rotor 7 rotates (on the side opposite the stator). A magnetoresistive (MR) element 11 is provided at a position opposite the FG magnet 9 provided on the external circumference of the rotor yoke 7. The rotational speed of the rotor 7 is detected by the MR element 11.

A convex portion 13 is provided on the mounting surface of a printed substrate 120 for locating when the MR element 11 is mounted. Further, a screw 24 (FIG. 4) for adjusting a spacing between the MR element 11 and the surface of the FG magnet 9 is provided so that an output detection signal from the FG magnet 9 can be adjusted optimally.

Further, a stator core 140 is provided about the bearing holer 2, and a coil 150 is wound around each pole of (multi-pole) salient poles. Furthermore, two grooves 19 (FIG. 5) are provided in the external circumference of a salient-pole 160 opposite the internal circumference of the drive magnet 8 to reduce a cogging torque.

The stator 1 is formed by superposing an iron plate 17 and the printed substrate 120 in two layers. The printed substrate (printed circuit board) 120 is secured to an end (left side in FIGS. 3 and 4) of the stator core 1 by means of a fixing screw 18 to prevent the printed substrate 120 from floating.

Figure 6:
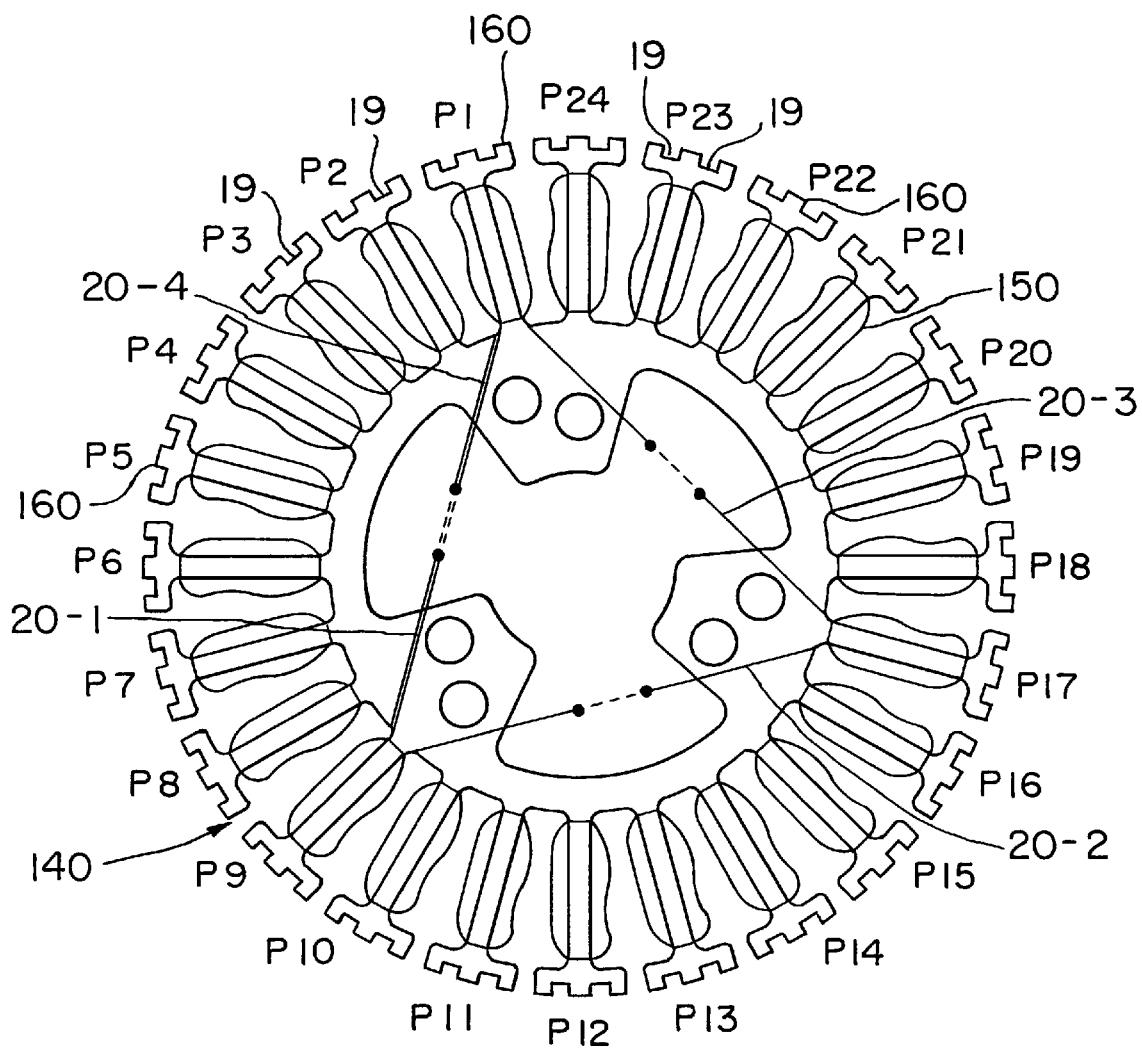
FIG. 6 shows an embodiment of a wire winding method for the stator core according to the present invention.

Next, a wire winding to the stator core 140 will be explained. As shown in FIG. 6, the number of poles of the stator 1 according to the embodiment is 3 phases at 24 poles. A description will be made of the salient poles 160 while attaching reference numbers from P1 to P24 in order thereto In the first phase, a first wire is wound as a coil about twice around a first pole P1 that is 8 (N=8) poles before a ninth {(N+1)–th} pole P9 (from which winding begins, and then moves to the pole P9, a first crossover 20-1 is formed, where a predetermined number of times of winding is applied to the pole P9 as a beginning of winding for the first phase.

Winding of the first wire is then applied while skipping over the salient poles every 2 poles, or applied to every third pole, i.e., a pole P12, pole P15, pole P18, pole P21, pole P24, pole P3, and pole P6, then the winding for the first phase is completed. Note, the crossover between the salient poles is formed from the root portion to the root portion of each salient pole.

Next, winding of a second wire is applied about twice to the pole P9, after which winding moves to a seventeenth {2N+1)–th} pole P17 while forming a second crossover 20-2. When winding of the second wire for the pole P17, a pole P20, pole P23, pole P2, pole P5, pole P8, pole P11, and pole P14 are done, the winding for the 2nd phase is completed.

Further, winding of a third wire is applied about twice to the pole P17, after which winding moves to the pole P1 while forming a third crossover 20-3, and when windings of the third wire for the pole P1, pole P4, pole P7, pole P10, pole P13, pole P16, pole P19, and pole P22 are done, the winding for the 3rd phase is completed.

Finally, when winding moves from the pole P22 to the pole P1, and winding of the third wire is applied about twice to the pole P1 after which a fourth crossover 20-4 is formed and winding moves to the pole P9 to which winding of the third wire is applied about twice, then every winding is completed. At this time, the winding direction is the same direction at all the salient poles 160, and the three crossovers 20-1 to 20-4 form a triangle. Further, two crossovers 20-1 and 20-4 are formed between the 1st pole and the 9th pole.

Subsequently, the stator core 140 for which winding is completed is mounted on the stator 1 with the crossover side made on the printed substrate 120'side. Intermediate portions of three places, i.e., the pole P1 and pole P9, the pole P9 and pole P17, and the pole P17 and pole PI of the crossovers 20-1 to 20-4 of the respective phases are cut at dotted lines shown in FIG. 6, and end portions the coils are soldered to rounds on the printed substrate 12.

At this time, two crossovers 20-1 and 20-4 are present between the 1st pole and the 9th pole, but the intermediate portions are cut whereby unnecessary terminal portions are abandoned. Since the soldered rounds of the printed substrate 120 are provided at the cut positions, the connection can be done very simply.

As described in detail, according to the present invention, since a triangle is formed, cutting positions of lead wires of coil terminals (end portions) of respective phases can be specified simply so that the assembly time can be shortened.

Further, since the winding direction is the same direction in all the salient poles, the time required for winding can be shortened and the winding efficiency is enhanced. Further, parts such as a holder, a metal pin and the like are not necessary to enable reduction in cost.

What is claimed is:

1. A stator core with 3N salient poles arranged circularly, N being a natural number of four or more but except a multiple of three, coils being formed around the salient poles, winding directions of the coils being the same for the salient poles, a first, a second and a third crossover being formed between a first and an (N+1)–th salient pole, between the (N+1)–th and a (2N+1)–th salient pole and between the (2N+1)–th and the first salient pole, respectively, the crossovers forming a triangle before cutting within the salient poles arranged circularly, an end portion of each crossover being connected to a substrate, the end portion being formed by cutting each crossover.

2. A method of winding a wire as a coil at a stator core with 3N salient poles arranged circularly, N being a natural number of four or more but except a multiple of three, the method comprising the steps of:

forming coils around the salient poles, winding directions of the coils being the same for the salient poles;

forming at least a first, a second and a third crossover between a first and an (N+1)–th salient pole, between the (N+1)–th and a (2N+1)–th salient pole and between the (2N+1)–th and the first salient pole, respectively, so that the crossovers form a triangle within the salient poles arranged circularly;

cutting an intermediate portion of each crossover; and connecting an end portion of each crossover formed by the cutting to a substrate.

3. The method according to claim 2, wherein the coil forming step comprises the steps of:

winding a first wire around the first salient pole that is N poles before the (N+1)–th salient pole;

winding the first wire around the (N+1)–th salient pole;

winding the first wire around every third salient pole from the (N+1)–th salient pole to a salient pole that is three poles before the (N+1)–th salient pole;

winding a second wire around the (N+1)–th salient pole;

winding the second wire around every third salient pole from the (2N+1)–th salient pole to a salient pole that is three poles before the (2N+1)–th salient pole;

winding a third wire around the (2N+1)–th salient pole;

winding the third wire around every third salient pole from the first salient pole to a salient pole that is three poles before the first salient pole; and winding the third wire around the (N+1)-th salient pole.

4. The method according to claim 3, wherein the crossover forming step comprises the steps of:

forming the first crossover using the first wire between the first and (N+1)-th salient poles;

forming the second crossover using the second wire between the (N+1)-th and (2N+1)-th salient poles; and forming the third crossover using the third wire between the (2N+1)-th and first salient poles; and winding the third wire around every third salient pole from the first salient pole to a salient pole that is three poles before the first salient pole.

5. The method according to claim 4, wherein the crossover forming step further comprises the step of forming a fourth crossover using the third wire between the first and (N+1)-th salient poles.

6. A method of winding a wire as a coil at a stator core with 3N salient poles arranged circularly; N being a natural number of four or more but except a multiple of three, comprising the steps of:

winding a first wire around a first salient pole that is N poles before an (N+1)-th salient pole;

forming a first crossover using the first wire between the first and (N+1)-th salient poles;

winding the first wire around the (N+1)-th salient pole;

winding the first wire around every third salient pole from the (N+1)-th salient pole to a salient pole that is three poles before the (N+1)-th salient pole;

winding a second wire around the (N+1)-th salient pole;

forming a second crossover using the second wire between the (N+1)-th salient pole and a (2N+1)-th salient pole;

winding the second wire around every third salient pole from the (2N+1)-th salient pole to a salient pole that is three poles before the (2N+1)-th salient pole;

winding a third wire around the (2N+1)-th salient pole;

forming a third crossover using the third wire between the (2N+1)-th and first salient poles;

winding the third wire around every third salient pole from the first salient pole to a salient pole that is three poles before the first salient pole;

forming a fourth crossover using the third wire between the first and (N+1)-th salient poles; winding the third wire around the (N+1)-th salient pole;

cutting an intermediate portion of each crossover: and soldering an end portion of each crossover formed by the cutting to a substrate.

* * * * *